(12) United States Patent
    Gaertner

(10) Patent No.: US 10,529,375 B2
(45) Date of Patent: Jan. 7, 2020

(54) WEAR MITIGATION SYSTEM FOR A MAGNETIC RECORDING MEDIUM

(71) Applicant: Seagate Technology LLC

(72) Inventor: Mark A. Gaertner, Vadnais Heights, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/957,354

(22) Filed: Apr. 19, 2018

(65) Prior Publication Data

US 2019/0325912 A1 Oct. 24, 2019

(51) Int. Cl.
    *G11B 20/18* (2006.01)
    *G06F 12/06* (2006.01)
    *G06F 3/06* (2006.01)

(52) U.S. Cl.
    CPC ........ *G11B 20/1889* (2013.01); *G06F 3/0616* (2013.01); *G06F 3/0638* (2013.01); *G06F 3/0653* (2013.01); *G06F 3/0676* (2013.01); *G06F 12/0646* (2013.01); *G06F 2212/1036* (2013.01)

(58) Field of Classification Search
    USPC .......... 360/27, 29, 31, 39, 51–55, 59, 69, 75
    See application file for complete search history.

(56) References Cited

U.S. PATENT DOCUMENTS

| 5,309,301 | A  | * | 5/1994  | Gregory ................. G11B 17/32 360/137 |
| 6,804,085 | B1 | * | 10/2004 | Azarian ............... G11B 5/3106 360/135 |
| 6,975,472 | B2 |   | 12/2005 | Stover et al. |
| 7,353,525 | B1 | * | 4/2008  | Dorbeck ................. C23C 16/26 720/648 |
| 7,817,370 | B2 | * | 10/2010 | Cromer .................. G11B 15/03 360/59 |
| 7,914,845 | B2 |   | 3/2011  | Reiter |
| 8,760,780 | B1 | * | 6/2014  | Brooker ................. G11B 27/36 360/31 |
| 8,817,413 | B1 |   | 8/2014  | Knigge et al. |
| 8,854,929 | B1 |   | 10/2014 | Champion et al. |
| 9,042,047 | B1 |   | 5/2015  | Dube |
| 9,196,302 | B1 |   | 11/2015 | Kuan et al. |
| 9,218,849 | B1 |   | 12/2015 | Trantham et al. |
| 9,390,761 | B2 |   | 7/2016  | Trantham et al. |
| 9,406,330 | B1 |   | 8/2016  | Kong |
| 9,569,121 | B1 |   | 2/2017  | Rausch et al. |
| 9,697,859 | B1 |   | 7/2017  | Tripathy et al. |
| 10,026,420 | B1 | * | 7/2018 | Rausch .................. G11B 5/012 |
| 2003/0223315 | A1 | * | 12/2003 | Gillis ..................... G11B 19/04 369/13.01 |
| 2014/0013052 | A1 |   | 1/2014  | Sawin et al. |

(Continued)

*Primary Examiner* — Tan X Dinh
(74) *Attorney, Agent, or Firm* — Hall Estill Attorneys at Law

(57) ABSTRACT

A wear mitigation system can be implemented in a data storage device. A data storage medium may be separated from a transducing head by an air bearing. A controller connected to the data storage medium and transducing head can be configured to reassign a physical address of the data storage medium from an unusable condition to a usable condition as a result of a self-healing of the data storage medium predicted by the controller.

20 Claims, 5 Drawing Sheets

(56) References Cited

U.S. PATENT DOCUMENTS

2016/0148652 A1\* 5/2016 Trantham ............... G11B 27/36
                                                    369/13.02
2017/0162222 A1    6/2017 Matousek et al.
2017/0236542 A1\* 8/2017 Kaddeche ............ G11B 5/4833
                                                    360/75

\* cited by examiner

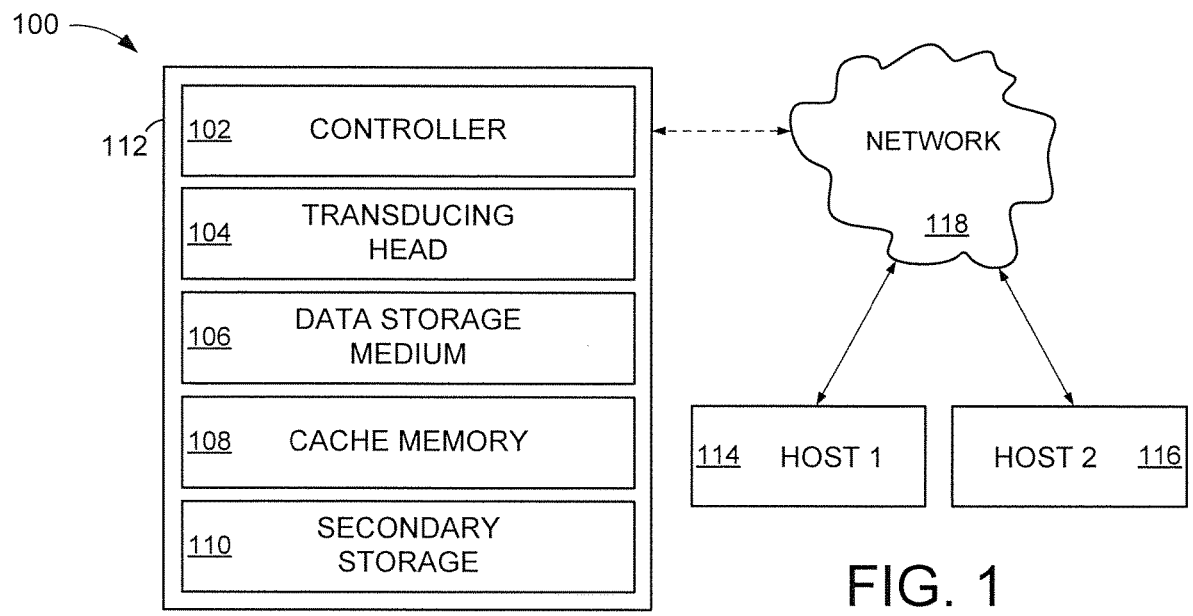
FIG. 1
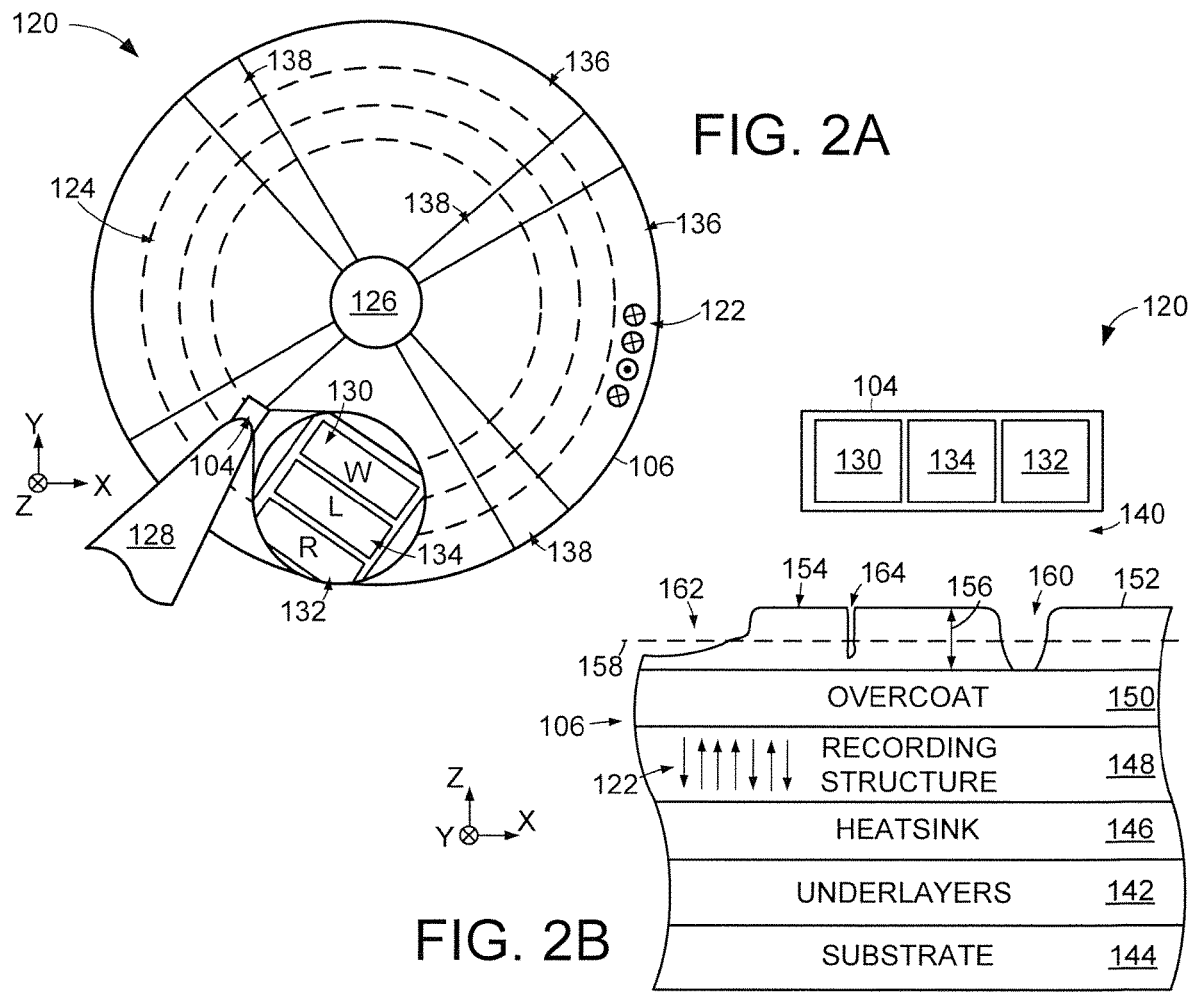
FIG. 2A
FIG. 2B

WEAR MITIGATION SYSTEM FOR A MAGNETIC RECORDING MEDIUM

SUMMARY OF THE INVENTION

A wear mitigation system, in accordance with some embodiments, has a controller connected to a data storage medium and a transducing head in a data storage device with the data storage medium separated from the transducing head by an air bearing. The controller is configured to reassign a physical address of the data storage medium from an unusable condition to a usable condition as a result of a self-healing of the data storage medium predicted by the controller.

Various embodiments of wear mitigation system predicts wear in a data storage device with a controller that is connected to a data storage medium and a transducing head of the data storage device where the data storage medium is separated from the transducing head by an air bearing. A physical address of the data storage medium is initially assigned as an unusable condition as a result of the predicted wear prior to being reassigned to a usable condition in response to a self-healing of the data storage medium predicted by the controller.

In other embodiments, a wear mitigation system detects wear in a data storage device with a controller that is connected to a data storage medium and a transducing head of the data storage device where the data storage medium is separated from the transducing head by an air bearing. Wear is predicted in a physical address of the data storage medium with the controller prior to a wear map being generated for a plurality of different physical addresses of the data storage medium. A physical address of the data storage medium is initially assigned as an unusable condition as a result of the predicted wear before being reassigned to a usable condition in response to a self-healing of the data storage medium predicted by the controller.

BRIEF DESCRIPTION OF THE DRAWINGS

FIG. 1 is a block representation of an example data storage system arranged in accordance with various embodiments.

FIGS. 2A and 2B respectively display line representations of portions of an example data storage system configured in accordance with some embodiments.

DETAILED DESCRIPTION

Figure 3:
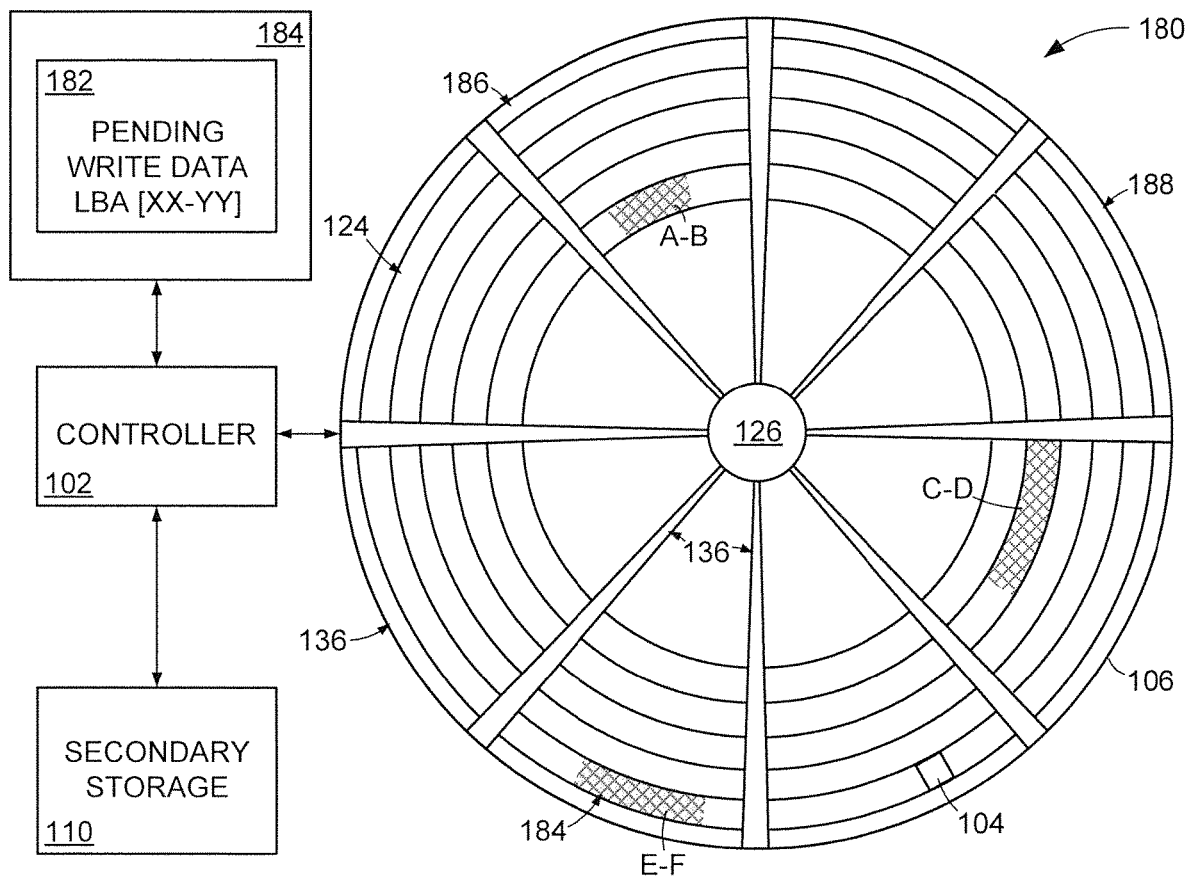
FIG. 3 illustrates portions of an example data storage device configured in accordance with some embodiments.

Assorted embodiments of the present disclosure are generally directed to a system that mitigates lube wear in a data storage device, such as a hard disk drive (HDD) or device with a rotating magnetic data storage medium.

In an effort to increase the data capacity and data access performance of data storage devices, data access components have become more complex. As such, components can be particularly susceptible to relatively small structural and operational variances that can occur. For instance, the incorporation of a laser into a transducing head allows for heat-assisted magnetic recording and increased data access performance, but can be susceptible to variations in head-media spacing that jeopardize the reliability of a data storage device.

FIG. 1 is a block representation of an example data storage system 100 in which various embodiments of the present disclosure may be practiced. A local controller 102, such as a microprocessor or programmable circuit, can direct operations of one or more transducing heads 104 in relation to one or more magnetic data storage media 106. The controller 102 may conduct data access operations, such as reads, writes, moves, remapping, and maintenance, on data stored in the medium 106 with the data access components of at least one transducing head 104.

The controller 102 may utilize one or more cache memories 108 and/or secondary storage locations 110 to temporarily, or permanently, to store data. A secondary memory 110 may be a circuit that is physically separate from the data storage medium 106, such as a different type of data storage, while the cache memory 108 can physically be a part of at least one data storage medium 106, such as a reserved physical or logical region. It is noted that the controller 102, heads 104, any medium 106, cache memory 108, and secondary storage 110 may be collectively packaged within a common housing 112.

The local controller 102 may operate individually or in combination with remote hosts, which may be controllers, nodes, and servers that are not resident in the housing 112. As shown, separate first 114 and second 116 hosts can each be connected to the controller 102 and data storage locations 106/108/110 via a network 118 that can be wired, wireless, or a combination thereof. The ability to operate the controller 102 as a standalone data storage device or as a networked component of a distributed computing system, such as a redundant array of independent devices (RAID) or cloud computing array.

FIGS. 2A and 2B respectively convey portions of an example data storage device 120 that can be employed in the data storage system 100 of FIG. 1 in accordance with some embodiments. FIG. 2A is a top view line representation of a data storage device 120 employing at least one magnetic data storage medium 106 in which various data bits 122 are stored. The data bits 122 are positioned on individual data tracks 124 that are radially spaced and concentric about a spindle 126 that rotates the medium 106. The data bits 122 are accessed by a transducing head 104 that is positioned proximal a selected data track 124 by an articulating suspension 128.

The transducing head 104 can be configured with multiple different data access components, but none are required or limiting. For instance, a head 104 can comprise a data writer 130 (W), data reader 132 (R), and write-assist assembly 134 (L), which may be configured to excite portions of the media 106 via a frequency generator, such as a laser or microwave. The write-assist assembly 134 can operate in conjunction with the writer 130 to efficiently program data bits 122 as directed by the local, or remote, controller 102. It is noted that the various data tracks 124 can be organized into user data regions 136 and non-user data regions 138 with the non-user data regions 138 storing data visible only to the controller 102 that maintains accurate and efficient data accesses, such as repeated runout correction and data track identification.

In FIG. 2B, a line representation of the data storage device 120 is displayed. The cross-sectional view of FIG. 2B illustrates how the data storage medium 106 can be a lamination of different layers arranged to provide reliable data bit 122 storage and accessibility via the transducing head 104 across the air bearing 140. The medium 106 can have one or more underlayers 142 disposed between substrate material 144 and a heat sink layer 146. The various underlayers 142 and heatsink 144 can collectively allow a magnetic pathway through a magnetic recording structure 148 from the head 104 to write data bit(s) 122 without accumulating too much heat from the write-assist assembly 134.

The recording structure 148 can be one or more layers that provide magnetic resolution corresponding to individual data bits 122. The recording structure 148 can be covered by at least one overcoat layer 150 that serves to protect the recording structure 148 from physical trauma caused by debris and/or contact with the transducing head 104. In some embodiments, the overcoat layer 150 supports a lube layer 152, as shown. The lube layer 152 can serve to trap debris and mitigate the effects of varying air bearing size, such as head-media contact. For example, the lube layer 152 can reduce performance degradation caused by thermal asperities in the medium 106 and operational variations of the head 104.

With the presence of the lube layer 152, the data storage medium 106 will have a recording surface 154 that corresponds with the top of the lube layer 152, closest to the transducing head 106. The lube layer 152 can be constructed of any material that provides an efficient air bearing 140 without degrading the data access capabilities of the head 104 or medium 106. The lube layer 152 can be configured with a constructed thickness 156, parallel to the Z axis, and a minimum thickness 158 that corresponds with accurate and efficient data access. That is, the lube layer 152 can be designed to have a fluctuating thickness 156 that remains above the minimum thickness 158 during operation.

However, the use of the write-assist assembly 134, along with other data access operations with a small head-medium spacing, can cause the lube layer 152 to fall below the minimum thickness 158. The non-limiting example lube layer 152 of FIG. 2B shows how heat and other alteration events from the transducing head 104 can induce the lube layer 152 to melt, liquefy, and reflow, which results in lube layer voids 160 that extend to the overcoat layer 150, depressions 162 that continuously extend below the minimum thickness 158 along the X-Y plane, and cracks 164 that sharply extend below the minimum thickness 158. Such reductions in lube layer thickness 160/162/164 can individually, and collectively, cause excessive wear to a corresponding transducing head 104 as well as the underlying recording structure 148 from physical head-medium contact and increased heat passing, unfiltered by sufficient amounts of the lube layer 152, to the recording structure 148.

With the advent of heat-assisted magnetic recording (HAMR) and the reduction in head-medium spacing, reliability of a data storage device can be increasingly susceptible to issues caused by excessive head 104 access to a particular area of the medium 106. For HAMR heads 104, an issue can be a limited capability for write power per hour, which can be characterized as write power on hour (WPOH). Excessive write access to a limited number of heads 104 may cause failures more quickly than in a device having more uniform distribution of write accesses across multiple different heads 104 and/or data locations on corresponding media 106.

In relatively small head-medium spacing configurations, concentrated read and/or write access from a head 104, along with passive dwell times, to a relatively small region of a medium 106 can disrupt the lube layer 152 and result in head 104 and medium 106 degradation, such as total head/device failure. Accordingly, various embodiments detect excessive use of a head 104 and/or medium 106 to allow a controller 102 to mitigate excessive wear proactively and/or reactively. Excessive wear mitigation can involve intelligently storing pending write data in locations that are less susceptible to WPOH capability and lube layer variations.

FIG. 3 illustrates portions of an example data storage device 180 configured in accordance with some embodiments to mitigate excessive wear. The data storage device 180 has one or more data storage media 106 each accessed by a respective transducing head to store, and retrieve, data from selected data tracks 124. As an example, portions of various data tracks 124 can have physical addresses A-B, C-D, and E-F, as shown, that are possible destinations for pending write data (WD) 182. It is noted that the logical addresses can comprise a single address or a range of multiple consecutive addresses, without limitation.

It is contemplated that the pending write data 182 has a logical block address (LBA) of XX-YY and is resident in a first cache memory location 184 while it is assigned a physical block address (PBA) by the controller 102. The controller 102 can assess any number of different physical addresses, such as ranges of consecutive PBAs like A-B, C-D, and E-F, to determine the amount of head and media wear by detecting the WPOH of the head 104 as well as the dwell time and lube layer thickness at the various PBAs.

In some embodiments, PBAs are reserved as a media cache for user-generated data and are not available for assignment of pending write data 182 until excessive wear in other PBAs and/or the corresponding head 104 is detected or predicted. As a non-limiting example, PBA range E-F can be designated as a media cache region 184 that is not utilized to store write data 182 until other PBA(s) of the recording surface 154, such as A-B and C-D, are deemed to experience excessive wear due to at least high WPOH or dwell times that are above a dwell threshold corresponding with lube layer thickness being below a minimum thickness threshold.

The media cache region 184 may be present on a different recording surface 154 and/or data storage medium 106 in a common housing 112 than the surface experiencing the excessive wear. It is noted that excessive wear can be temporary in nature and, as such, can change over time to become available for pending write data 182. In response to detection or prediction of excessive wear, the controller 102 may also store pending write data 182 in a secondary storage 110 that is physically separate from the data storage medium 106, such as volatile and non-volatile type solid-state memories like NAND, DRAM, or SRAM. The controller 102, in some embodiments, concurrently, or sequentially, writes pending write data 182 to both media cache 184 and secondary storage 110 to allow for later data organization and permanent data storage in a non-cache PBA at a later time.

The controller 102 can distinguish and characterize detected, and predicted, wear to a head 104 and/or PBA(s) into different hierarchical levels that aid in the determination of which temporary storage location is appropriate for pending write data 182. For instance, high amounts of wear can induce the controller 102 to send pending writes 182 to a non-volatile secondary location 110 while moderate amounts of wear correlate with a volatile secondary location 110 and relatively low amounts of wear correlate with media cache 184 data storage. Such a hierarchy of wear identification and temporary write data storage locations 110/184 allows the controller to intelligently manage head and/or media wear while maintaining nominal data throughput to a host 114/116.

The controller 102, at any time, can map some, or all, of a recording surface 154 for current and predicted wear. Such wear mapping may be completely reactive in response to detected usage, completely proactive as a relation of current usage to pending data access operations, or a combination of reactive and proactive determinations. As a non-limiting example, the controller 102 can map wear for a first user data region 186 reactively and for a second user data region 188 proactively based, at least in part, to the results of the first user data region 186.

The controller 102 can be configured to analyze multiple different transducing heads 104 and recording surfaces 154 for multiple different media 104 resident in a common housing 112, or in different housings across a distributed network 118. With the detected and/or predicted wear, the controller 102 can determine if data migration to alternate, non-assigned, locations, such as media cache 184 or a secondary storage 110, is appropriate by weighing at least the frequency of access of the pending write data 184 versus the value of retaining existing data in the alternate locations. In other words, the alternate locations can have relatively small capacity and storage of pending write data 184 may cause previously stored data to be overwritten or otherwise lost.

The determination of where to place the pending write data 182 can involve the prediction and/or measuring of lube layer healing caused by normal data access operations. For instance, the controller 102 can detect, or predict, a lube layer thickness deficiency that renders the location unusable for data accesses then predict when the lube layer will self-heal due to material reflow as a result of data accesses to other portions of the recording surface 154. In other words, the controller 102 can predict when lube layer material will reflow to partially, or completely, fill a void 160, depression 162, or crack 164 to a thickness greater than the minimum thickness 158, which allows the location to be utilized for data access operations.

Figure 4:
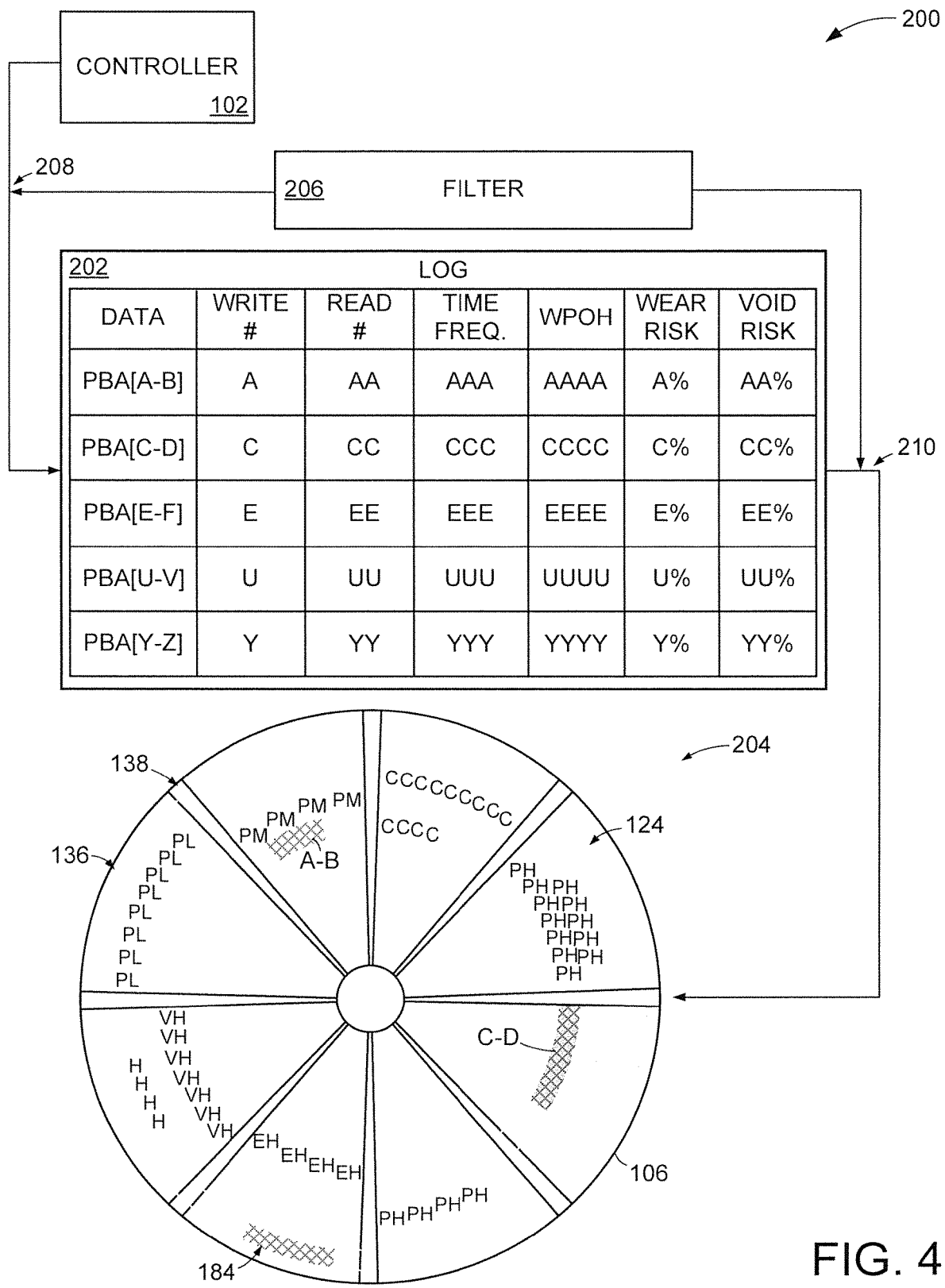
FIG. 4 conveys portions of an example data storage device arranged and operated in accordance with various embodiments.

FIG. 4 conveys portions of an example data storage device 200 arranged and operated in accordance with various embodiments. One or more logs 202 can be generated and maintained by at least a local, or remote, controller 102. A log 202 can compile historical data accesses and other usage of a transducing head 104 and media 106 that can result in wear. For instance, the controller 102 can log the LBA corresponding to a written or read PBA on a recording surface, the frequency over time of data accesses to that PBA, the WPOH of the head 104 corresponding to that PBA, and if data accesses were proximal enough to the PBA to heighten the risk of lube layer voids, depressions, and/or cracks.

The log 202 may have proactive metrics, such as likelihood of wear and risk of voids and other reductions in lube layer thickness, that are computed based on predetermined modeling algorithms and/or historic detected wear. The historical, reactive metrics of the log 202 along with the proactive metrics can be compiled by the controller 102 to produce a wear map 204. The wear map 204 may indicate actual, predicted, or risk of wear for various PBA ranges on one or more recording surfaces 154. It is contemplated that the wear map 204 separately indicates read wear, which relates to lube voids, separately from write wear, which relates to WPOH along with lube voids.

In some embodiments, the controller 102 utilizes one or more filters 206 to compile the log 202 or the wear map 204. A bloom filter 206, for instance, can be utilized in position 208 to compile the log 202 or in position 210 to generate a wear map by providing detecting frequently accessed data LBAs, and their associated PBAs on media 106, with a fine granularity, such as a single user data region 136 or less than an entire data track. For instance, a decaying bloom filter can be employed to detect the frequency of data reads, data writes, and other data maintenance activity over time to various portions of a recording surface, which allows the wear map 204 to convey real-time, current head and media activity.

One or more hierarchical filters 206 can allow the wear map 204 to convey varying degrees of current, historical, and predicted data access activity. The non-limiting example read and write wear maps 204 of FIG. 4 show how one or more filters 206 can process the information compiled in the log 202 into actual, historical activity by assigning current identifiers for hot (H), very hot (VH), extremely hot (EH), and critical (C) locations of a data storage medium 106. Filters 206 may be utilized to additionally indicate varying degrees of predicted risk, such as predicted low (PL), medium (PM), and high (PH) chance of degraded head and/or media data access performance.

It is noted that the wear map 204 can be generated and displayed for multiple different recording surfaces 154 and/or media 106 concurrently or sequentially. The ability to current data access activity and predicted risk of head and/or media performance degradation for various PBAs of user data regions allows the controller 102 to intelligently mitigate head and/or media wear by changing a previously assigned destination for pending write data 182 to a temporary, or permanent, media cache 184 or secondary storage 110.

The identification of areas of media wear with the wear map(s) 204 allows the controller 102 to evaluate if corrective activity can be conducted to improve the existing media 106 condition and/or decrease the risk of future data access degradation. For example, the controller 102 can determine from the wear map(s) 204 that the lube layer 152 is damaged, below the minimum thickness 158, and can be repaired by heating portions of the lube layer 152 proximal the damaged regions or via normal data access operations to the recording surface.

That is, the controller 102 can activate a heating means, such as a laser, of a head to heat selected portions of a lube layer 152, such as a data track 124 immediately adjacent to a damaged data track, to cause the material of the lube layer 152 to reflow and fill voids 160 to a thickness greater than the minimum thickness 158. With the ability to monitor and predict how the lube layer will reflow and heal by filling reductions in thickness in response to data access operations, the controller 102 may alter the PBA of pending write data to manipulate the speed and/or location of lube layer reflow. As a result, the controller 102 can take proactive measures to heal PBA(s) what otherwise would be unusable due to reduction in lube layer thickness or the controller 102 can predict when data accesses to various PBA(s) will induce healing of lube layer depletions without taking proactive measures.

Accordingly, lube layer 152 healing may be organized by the controller 102 to occur concurrently with future data writes. For instance, the controller 102 can alter the PBA of pending write data 182 to a data track 124 and user data region 136 that is physically proximal to a detected, or predicted, void 160 so that write-assist activity involved with writing the write data 182 causes the lube layer 152 to reflow and at least partially fill one or more voids 160. It is contemplated that the controller 102 can direct a head to conduct extra heating operations on portions of a data track 124 after a data write operation to the data track 124 and without writing data in order to more fully fill detected, or predicted, voids 160.

However, it is noted that such healing operations can increase the WPOH of a head. As such, the controller 102 can utilize the log 202 and wear map(s) 204 to balance the increased WPOH with the number and severity of lube layer voids 160 to intelligently utilize predicted lube layer 152 healing. The ability to detect and predict lube layer healing illustrates how compilation of the log 202 and generation of a wear map 204 with hierarchical identifiers allows for optimized handling of pending write data 182 as well as mitigation of head and media wear.

Figure 5:
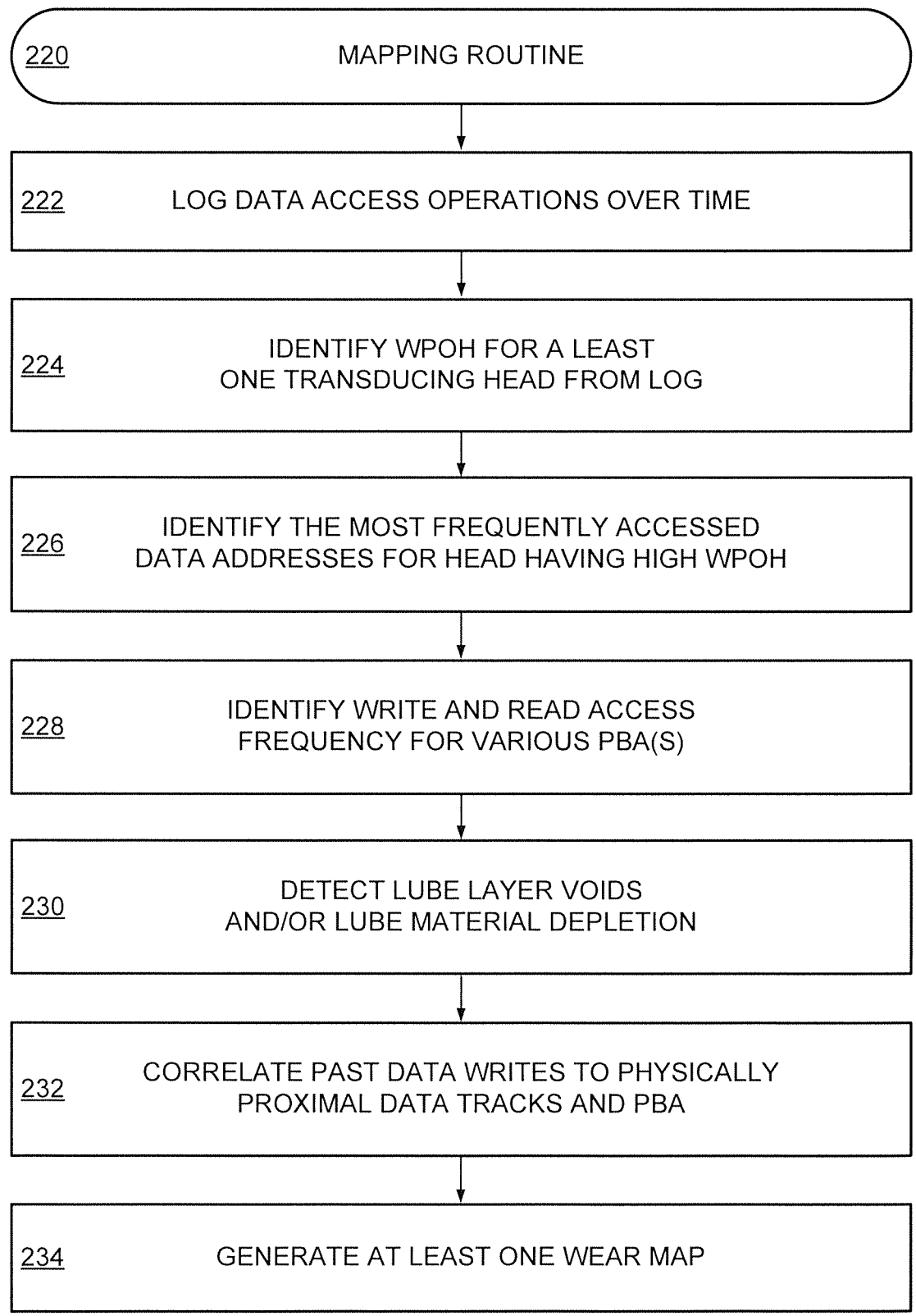
FIG. 5 displays a flowchart of an example mapping routine that can be carried out by the embodiments of FIGS. 1-4.

FIG. 5 displays a flowchart of an example mapping routine 220 that can be carried out by the embodiments of FIGS. 1-4 to generate at least one wear map. The routine 220 can begin with the logging of data access operations over time in step 222 with a local controller. Such logging can be conducted continuously or sporadically in real-time or retroactively for data access operations to one or more different data storage media and recording surfaces.

The controller can log any number, and type, of metrics corresponding to data read, data write, and non-user initiated data maintenance operations in step 222. Step 224 identifies the WPOH for at least one transducing head from the logged metrics from step 222. Step 224 may be configured to evaluate the WPOH of a head for several different hours, such as at least 3 consecutive hours. The WPOH identification of step 224 may involve computing the normalized standard deviation of several different hours of logged information. It is contemplated that step 224 may save the WPOH distribution for different heads as well as a single head across several different data tracks 124.

Step 224 may compare saved WPOH distributions for past activity against current detected WPOH distribution to predict future WPOH activity. As a result of step 224, a controller can identify in step 226 the most frequently accessed data addresses (LBA/PBA) on a recording surface by a head having a WPOH that exceeds a predetermined threshold. Alternatively, step 226 can identify a number of head data write operations that can be conducted for a given amount of time, such as over the upcoming hour, to prevent a heightened risk of head errors and/or failures.

The logged data compiled in step 222 may further be employed in step 228 to identify the write and read access frequency for various PBAs in one or more user data regions. A filter, such as a bloom filter, can be utilized in step 228 to provide fine grain resolution of PBAs that allows the detection of lube layer voids as well as the prediction of lube material depletion in step 230. Next, step 232 uses the logged information from step 222 to correlate data writes to physically proximal data tracks into the write frequency of the various data tracks of a user data region. That is, step 232 can identify that while PBA of a data track are not directly written to, a data write proximal to the PBA can increase the risk of lube layer voids at the proximal PBA. Hence, the controller can condition a proximal data write with a predetermined value, such as 50%, for computation of lube layer void risk in the proximal, non-accessed PBA.

Routine 220 proceeds to step 234 where the information logged, compiled, and correlated in steps 222-232 are collectively utilized to generate at least one wear map. The wear map of step 234 can be visually represented, as shown in FIG. 4, or statistically represented with historically detected data access information as well as predicted risk of head/media wear for various user data regions of one or more recording surfaces. A wear map generated in step 234 may be parsed by the controller to convey only head wear information, media wear information, historical information, or predicted risk for one or more data tracks, PBAs, and/or LBAs.

Figure 6:
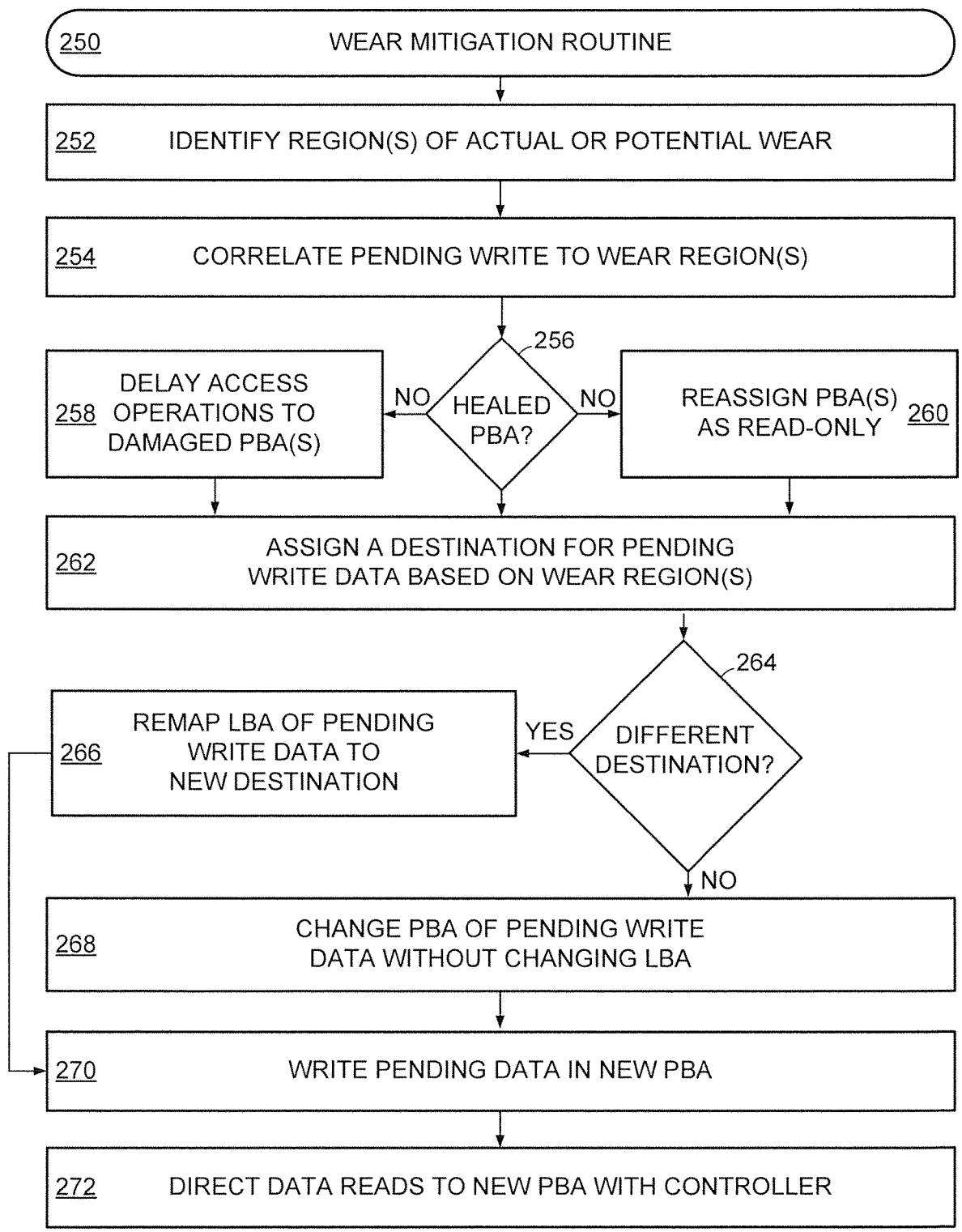
FIG. 6 depicts an example wear mitigation routine 250 that may be executed with the various embodiments of FIGS. 1-4.

The mapping of detected and predicted wear in routine 220 allows a controller to determine if wear can be mitigated. For instance, a controller can consult one or more wear maps to balance the value of migrating data against the value of retaining data in alternate storage destinations, such as cache or secondary storage. FIG. 6 depicts an example wear mitigation routine 250 that may be executed with the various embodiments of FIGS. 1-4 to optimize the data access performance of a data storage device over time. Initially, step 252 identifies at least one physical data location as having actual, or potential, wear. Step 252 may involve a wear map generated by routine 220 and can result in a controller designating one or more PBAs as unusable as a result of lube layer thickness being below a predetermined minimum threshold.

The wear identified in step 252 can indicate one or more PBAs and/or transducing heads that have, or are likely to have, degraded data access performance within a predetermined time frame, such as over the next minute, hour, or day. A controller then correlates the identified location(s) of wear in step 254 with pending write data stored in a write buffer. That is, step 254 can cross-reference the PBAs indicated in step 252 with wear with the assigned LBAs of the pending write data to identify if pending data has been assigned to a head and/or PBA with excessive wear.

With the identification of pending write data assigned to a worn destination, decision 256 can evaluate if the PBA have been healed either through lube correction operations or other scheduled data accesses to other PBAs of the lube layer. For lube correction operations, the lube layer may be excited in a pattern generated by the controller to induce the lube layer to reflow and at least partially fill one or more voids. If the PBA is not healed, decision 256 can trigger step 258 to delay one or more pending data access operations to the PBA(s) having reduced lube layer thickness in order for other data access operations to induce lube layer reflow that heals the PBA and renders the location available for data access operations.

Alternatively, decision 256 can prompt step 260 to reassign PBA(s) experiencing reduced lube layer thickness as read-only addresses. Decision 256 can evaluate if a PBA is going to heal in sufficiently in a predetermined timeframe, within a predetermined number of data access operations, or prior to unwanted head wear to determine if step 258 or step 260 is a better path to optimizing data access performance. The ability to evaluate the healing properties of a lube layer in decision 256 allows PBAs that are deemed unusable to be later employed for data access operations without jeopardizing the reliability of the stored data.

At the conclusion of step 258 or 260, or if decision 256 determines no PBAs of interest are going to be involved in self-healing as a result of reflow from data access operations to other PBAs of a recording surface, step 262 assigns a destination location for the pending write data identified in step 254 to be written to location of excessive wear. It is contemplated that step 262 can re-assign the previous destination for pending write data, assign a new PBA on the same recording surface as the originally assigned destination, assign a new PBA on a different recording surface then the originally assigned destination, or assign a new LBA on a different type of storage, such as a volatile or non-volatile memory. Such options allow a controller to evaluate if migration of data is appropriate with regards to the data currently stored in alternate storage destinations.

In some embodiments, step 262 assigns a destination based on the degree of wear detected, or predicted, in step 252. For example, detected wear can cause step 262 to assign pending write data to non-volatile or volatile memory depending on the severity of wear while predicted risk of wear can cause step 262 to assign pending write data to flash memory or media cache locations. Step 262 may further discern assigned destinations based on read wear or write wear, such as head degradation or media degradation.

The assignment of pending write data to a destination with regards to destination wear leads routine 250 to decision 264 where the destination is evaluated compared to the originally assigned storage location. If the newly assigned destination is to a different type of memory than the original destination, step 266 remaps the LBA of the pending write data to the newly assigned destination. If the newly assigned destination is to media cache, step 268 changes the PBA of the pending write data without changing the data's LBA.

The handling of the LBA of the pending write data with decision 264 allows step 270 to then migrate the pending write data to the newly assigned destination. Finally, future data access read operations to the once pending, now written, write data are directed by the controller in step 272 to the destination carried out in step 270.

The various aspects of routines 220 and 250 are not required, or limiting. As such, any aspect can be changed, removed, or replaced without deterring from the spirit of the present disclosure. For example, steps and/or decisions can be added for evaluating and potentially assigning pending read data to different destinations based on detected, or predicted, head and/or media wear.

Through the various embodiments of the present disclosure, head and media wear caused by normal data storage operations can be mitigated. The ability to monitor and predict the healing of lube layer reductions in thickness allows the data capacity and data access performance of a data storage device to be maintained despite excessive wear to portions of the device. By generating a wear map for assorted user data regions of a data storage medium, a controller can intelligently evaluate if migration of pending write data is appropriate, when a location will self-heal, and what destination type of memory best suits the current conditions of the data storage device.

What is claimed is:

1. An apparatus comprising a controller connected to a data storage medium and a transducing head, the data storage medium separated from the transducing head by an air bearing, the controller configured to reassign a physical address of the data storage medium from an unusable condition to a usable condition as a result of a self-healing operation of the data storage medium predicted by the controller, the self-healing operation corresponding with a portion of the data storage medium reflowed with a laser of the transducing head.

2. The apparatus of claim 1, wherein the transducing head comprises a reader, writer, and the laser.

3. The apparatus of claim 1, wherein the unusable condition corresponds with a lube layer of the data storage medium having a first thickness that is less than a thickness threshold.

4. The apparatus of claim 1, wherein the usable condition corresponding to the lube layer having second thickness that is greater than the thickness threshold.

5. A method comprising:
predicting wear in a data storage device with a controller, the controller connected to a data storage medium and a transducing head of the data storage device, the data storage medium separated from the transducing head by an air bearing;
assigning a physical address of the data storage medium as an unusable condition as a result of the predicted wear; and
reassigning the physical address to a usable condition in response to a self-healing operation of the data storage medium predicted by the controller, the self-healing operation comprising activating a laser of the transducing head to reflow a portion of the data storage medium.

6. The method of claim 5, wherein the controller compiles a plurality of different metrics about the data storage medium and transducing head to predict wear.

7. The method of claim 5, wherein the predicted wear is a lube layer of the data storage medium being below a minimum thickness.

8. The method of claim 5, wherein the predicted wear is write power on hour of the transducing head exceeding a threshold value.

9. The method of claim 5, wherein the predicted wear is based on wear detected by the controller.

10. The method of claim 5, wherein the self-healing operation of the data storage medium comprises a lube layer of the data storage medium reflowing to fill at least one reduction in lube layer thickness.

11. The method of claim 9, wherein the reflowing is a result of data access operations to a common recording surface of the data storage medium.

12. The method of claim 9, wherein the controller assigns pending write data to locations proximal to the physical address to induce the self-healing operation.

13. The method of claim 5, wherein the controller delays at least one pending data access operation to the physical address until the usable condition is assigned.

14. The method of claim 5, wherein the controller assigns the physical address as read-only until the usable condition is assigned.

15. A method comprising:
detecting wear in a data storage device with a controller, the controller connected to a data storage medium and a transducing head of the data storage device, the data storage medium separated from the transducing head by an air bearing;
predicting wear in a physical address of the data storage medium with the controller;
generating a wear map for a plurality of different physical addresses of the data storage medium;
assigning a physical address of the data storage medium as an unusable condition as a result of the predicted wear; and
reassigning the physical address to a usable condition in response to a self-healing of the data storage medium predicted by the controller.

16. The method of claim 15, wherein the wear map identifies at least two different degrees of wear for at least two of the plurality of different physical addresses.

17. The method of claim 15, wherein the wear map identifies the detected wear and the predicted wear.

18. The method of claim 15, wherein the wear map identifies read wear separately from write wear.

19. The method of claim 15, wherein the controller compiles a log of historical activity to the plurality of different physical addresses, the wear map derived from the log by the controller.

20. The method of claim 19, wherein the controller applies a bloom filter to compile the wear map.

\* \* \* \* \*